Aug. 7, 1928.

S. Z. DE FERRANTI 1,679,712

DIRECT CURRENT ELECTRICITY METER

Filed Feb. 10, 1925

Inventor
S. Z. de Ferranti
By Marks Clerk

Aug. 7, 1928. 1,679,712
S. Z. DE FERRANTI
DIRECT CURRENT ELECTRICITY METER
Filed Feb. 10, 1925 4 Sheets-Sheet 2
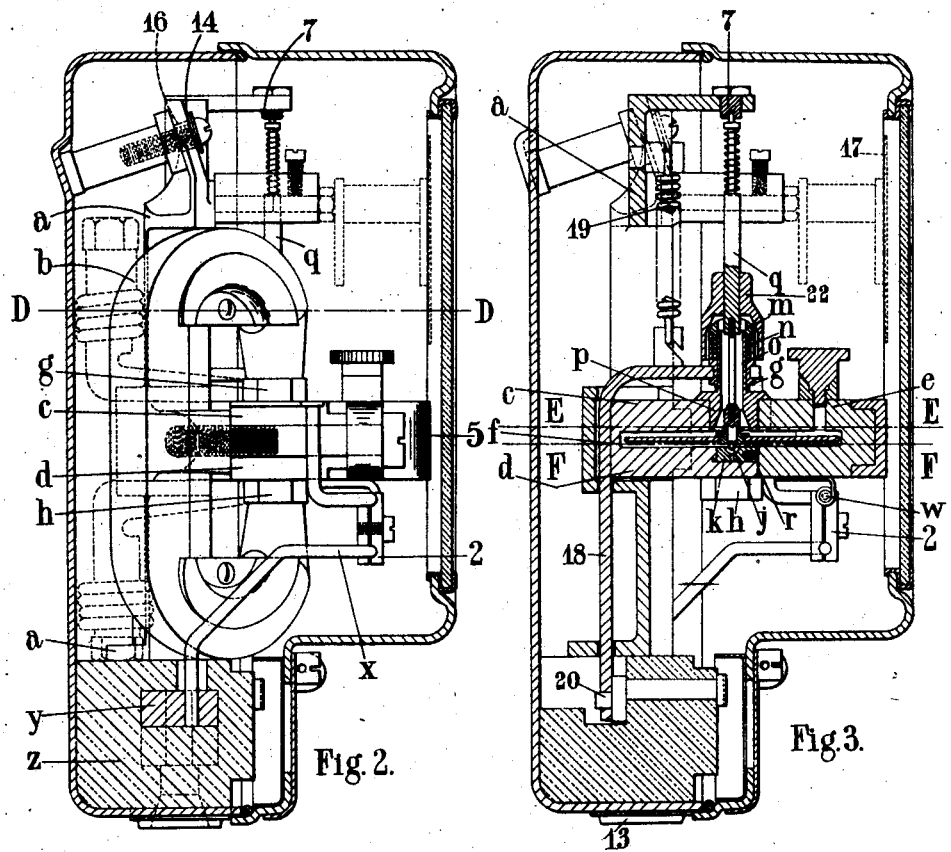
Fig. 2.
Fig. 3.
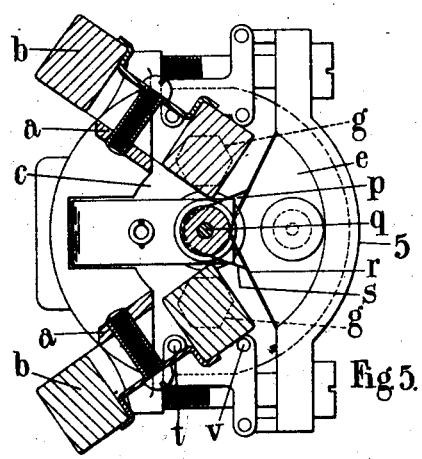
Fig. 5.
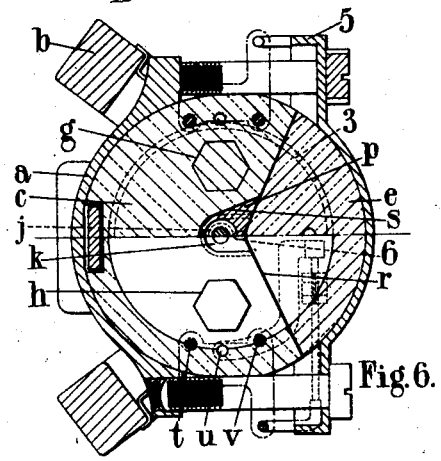
Fig. 6.
Inventor
S. Z. de Ferranti
By Marker Clerk
Attys.

Aug. 7, 1928.  
S. Z. DE FERRANTI  
1,679,712  
DIRECT CURRENT ELECTRICITY METER  
Filed Feb. 10, 1925  
4 Sheets-Sheet 3

Inventor  
S. Z. de Ferranti  
By Marks & Clerk  
Attys.

Aug. 7, 1928. 1,679,712
S. Z. DE FERRANTI
DIRECT CURRENT ELECTRICITY METER
Filed Feb. 10, 1925 4 Sheets-Sheet 4

Inventor
S. Z. de Ferranti
by Marks & Clerk
Attys.

Patented Aug. 7, 1928.

1,679,712

UNITED STATES PATENT OFFICE.

SEBASTIAN ZIANI DE FERRANTI, OF HOLLINWOOD, ENGLAND, ASSIGNOR TO FERRANTI, LIMITED, OF HOLLINWOOD, ENGLAND.

DIRECT-CURRENT ELECTRICITY METER.

Application filed February 10, 1925, Serial No. 8,279, and in Great Britain March 3, 1924.

This invention relates to direct current electricity meters of the type including a disc rotor immersed in a mercury bath and so carried upon a spindle which gears it to the measuring train as to be rotatable between the poles of one or more permanent magnets.

The invention has for its object to provide improved constructions of such meters which shall possess considerable advantage over those hitherto known.

The chief advantage which my invention provides is the ability to secure ready access to the spindle and rotor and the ability to erect or dismantle the rotor and spindle as a complete unit without disturbing the magnetic circuit.

Certain other advantages will appear from consideration of the description given below. The accompanying drawings illustrate one example of carrying the invention into effect in which:—

Figure 2 is a section on the staggered line B—B of Figure 1;

Figure 3 is a vertical section on the line C—C of Figure 1;

Figure 5 is a horizontal section on the line D—D of Figure 2.

Figure 1:
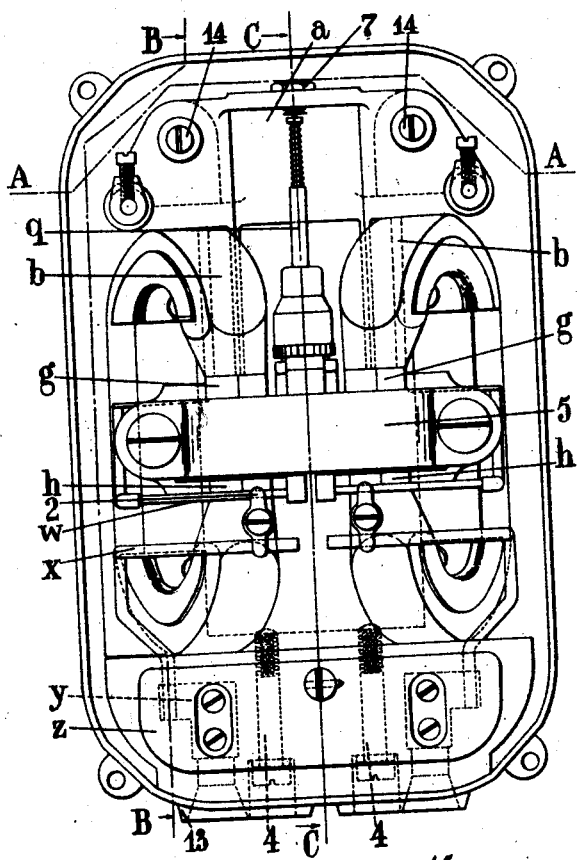
Figure 1 is a front elevation.
Figure 4:
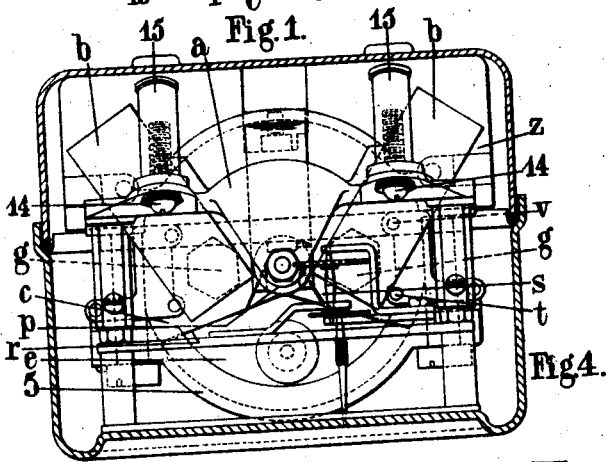
Figure 4 is a horizontal section on the staggered line A—A of Figure 1.
Figure 7:
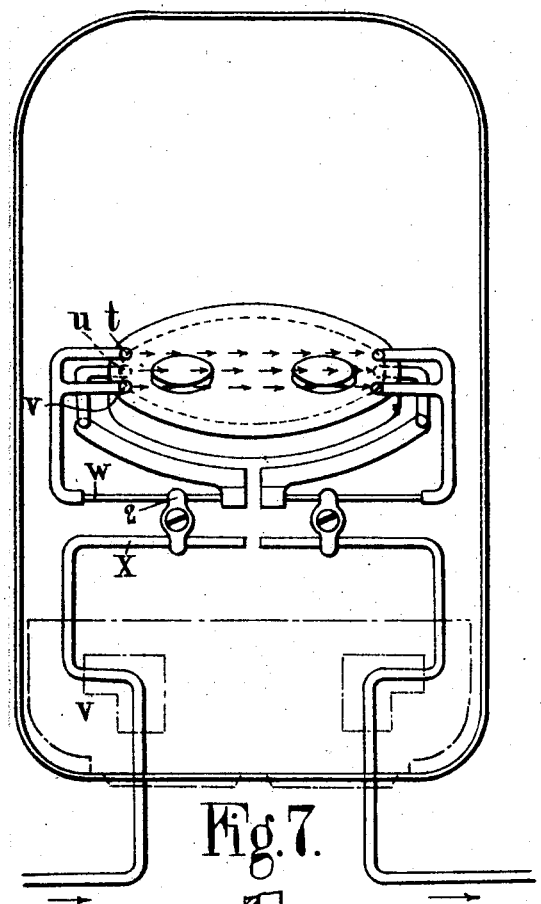
Figure 8:
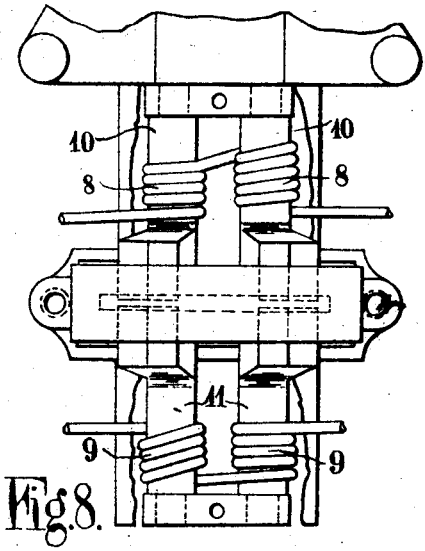
Figure 10:
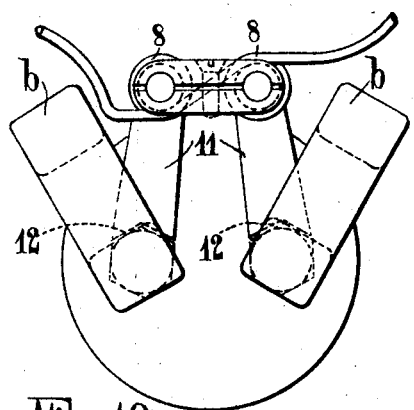
Figure 9:
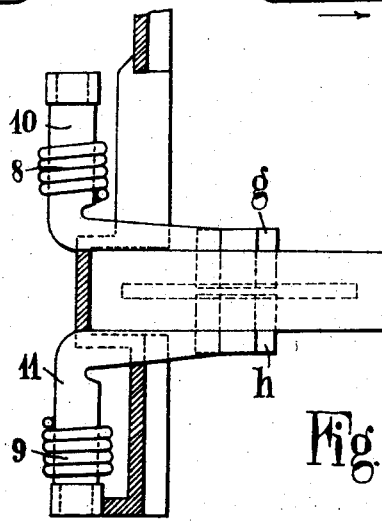
Figure 11:
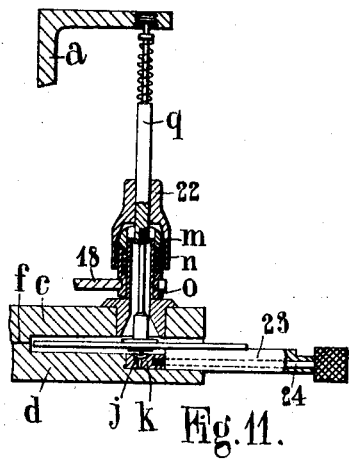
Figure 15:
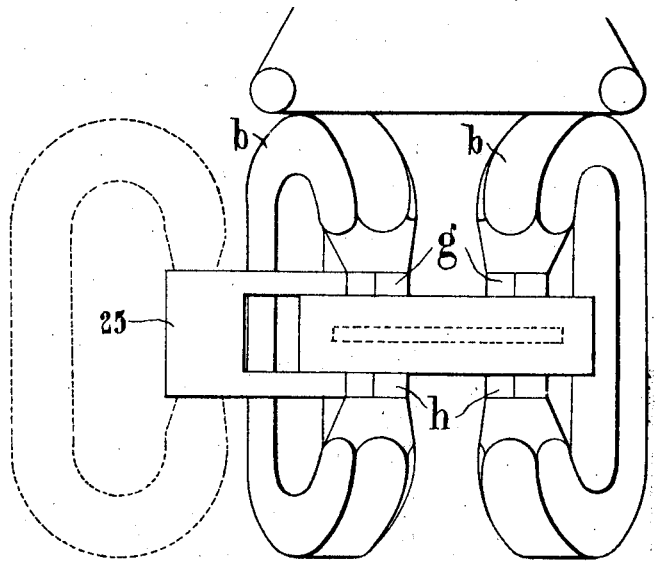
Figure 12:
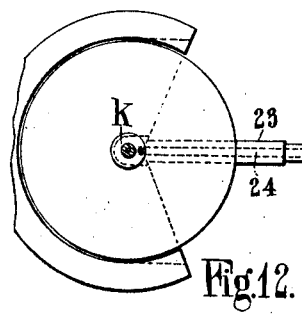
Figure 14:
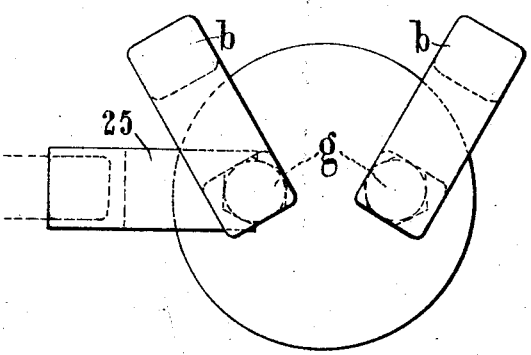
Figure 13:
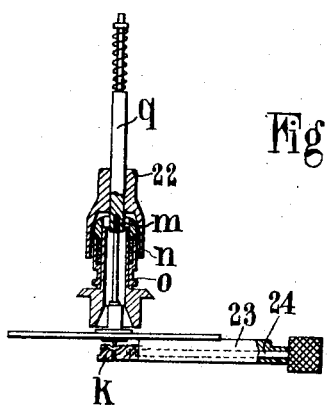

The upper half of Figure 6 is a horizontal section on the line E—E of Figure 3; and the lower half of Figure 6 is a horizontal section on the line F—F of Figure 3;

Figure 7 is a diagrammatic view indicating the current paths through the meter;

Figures 8, 9 and 10 illustrate front elevational, side elevational and plan views respectively of the compensating magnets;

Figures 11, 12 and 13 illustrate a method of withdrawing the lower bearing block, and Figures 14 and 15 illustrate a method of removal of the magnets.

In carrying the invention into effect in one form by way of example as applied to a meter with disc rotor, I provide a non-magnetic metal frame $a$ formed with a bed for the mercury bath and for two C-shaped permanent magnets $b, b$ which straddle the bath. The bath itself is circular and is moulded in three portions of which the upper and lower portions $c, d$ constitute the top and bottom members of the bath respectively and the third $e$ constitutes the removable part whose function will be explained below. The upper and lower bath portions are each furnished with faced contiguous surfaces so that when clamped together a mercury-tight joint at $f$ is secured, varnish or other adhesive material being employed at this joint, if desired.

The upper bath member $c$ is provided with a pair of soft iron studs $g, g$ disposed equidistant from the centre on a diameter and the lower bath member is similarly provided at $h, h$. These studs, which constitute pole pieces, are moulded in position and each is of such length as to project somewhat above and below the boundaries of the bath. The studs also project slightly within the bath and the latter is thickened slightly in the region of the studs so as to form slightly outstanding bosses with chamfered edges.

The footstep bearing comprises a jewel $j$ set in a block $k$ which is slidable radially in a groove formed in the bottom member $d$ of the bath and the usual loose collar $m$ embodying packing $n$ is provided to enable sealing of the mercury outlet and locking of the spindle during transit. The inner member $o$ of this gland is formed on a block $p$ through which the spindle $q$ passes and which block accurately fits a notch in the bath proper and conforms to the curvature of the removable portion $e$ of the bath.

This mechanism for effecting the locking of the spindle against its upper bearing 7 during transit is effected by means of a cranked member 18 whose forked end engages a groove in the loose collar, the spring 19 tending to lift the member 18 and being restrained by the pin eccentrically mounted on the spindle 21. When the spindle occupies the position shown in Figure 3 the member 18 is drawn down so that the cap $m$ does not bear against the collar 22 fixed to the meter spindle, but when the spindle is partially rotated the spring 19 draws up the cranked member and forces the cap $m$ against the conical internal surface of the collar 22, thus both lifting the spindle off its footstep bearing and effecting a sealing of the mercury chamber.

It will be understood that as the member 18 is guided in the frame $a$ and not by the meter casing, there is no necessity to provide insulation between the member and the casing other than that which separates the meter mechanism as a whole from the casing.

A suitable non-sticking packing piece $r$ is preferably interposed between the block $p$ and the notched faces against which it is clamped.

The removable part $e$ of the bath is formed somewhat of sector shape and is adapted to be clamped against appropriately shaped faces on the bath proper and on the front of the block referred to above, a suitable non-sticking packing piece $s$ preferably being interposed also at this joint.

The two C-shaped permanent magnets $b, b$ are clamped to two suitable faces on the non-magnetic frame $a$ so as to register with the soft iron pole pieces $g, h$ moulded in the bath and each is removable without disturbing any other part of the meter. The polarity of the two magnets is such that unlike poles are formed at the two pole pieces in the upper wall of the bath. Current is led into the bath by way of three studs $t, u, v$ let into the periphery of the bath, the central stud $u$ being coupled to one end of a resistance $w$ whose other end is connected to both the remaining studs. This resistance acts in the manner of a potentiometer when the point thereon at which connection to the external circuit is established is varied and means are thus provided whereby the "constant" of the meter may be adjusted. Current is similarly led out of the bath after passage through the mercury and disc, i. e. between the air gaps of both magnetic circuits.

Each resistance comprises conveniently a single short length of wire $w$ (of material possessing considerable specific resistance) which is supported by the leads terminating in the studs $t$ and $v$ and in the stud $u$. Disposed parallel to each resistance is a single short length of copper $x$ which in turn is supported by its attachment to a meter terminal $y$ in the terminal block $z$. A slider 2 which may be clamped in any desired position along the pair of wires is provided and constitutes the lead-in and lead-out point of each resistance unit respectively.

This construction is indicated diagrammatically in Figure 7 and in action it will be appreciated that two paths through the meter are open to the current as indicated by the arrows:—(1) the path from the stud $u$ to the corresponding stud at the opposite side of the bath and (2) the paths which are chords to the circumference of the bath. The current passing by path (2) is not able to produce so large a torque as that passing by path (1) and thus by varying the position of the slider 2 and so varying the current distribution through the two paths the torque produced by a given current flow through the bath may be adjusted as desired.

Means for compensating the drooping characteristic of the percentage-error-load curve of the meter may be effected conveniently as is indicated in detail in Figures 8–10 and indicated by dotted lines in Figure 2 by providing compensating coils 8 between the two magnet poles above the disc 3 and further coils 9 disposed between the two cores 10 and 11 respectively, in such manner and so connected that when energized by the load current they divert some of the flux from the operative air gaps in the bath, whilst not, however, varying the flux within the steel constituting the permanent magnets.

It will be noted that air gaps 12 are provided in order to provide the necessary reluctance in the magnetic shunt path which the cores 10, 11 constitute.

Although variation of the main flux in the air gaps within the bath affects both the driving and the braking torques, since each main flux serves both to drive and to brake, effective compensation is possible on account of the fact that a given variation of these fluxes causes a larger variation in braking torque than in driving torque.

It will also be seen that the actual path of the flux traversing the steel of the magnets is not changed by diversion of some of the main flux from the air gaps within the meter bath.

The terminal block $z$ comprises insulating material which is screwed to the non-magnetic frame $a$ by two screws 4, 4 and which carries embedded therein suitable terminals.

This terminal block is formed with projecting bosses 13 which register with corresponding holes in the meter casing and thus hold securely in position within the casing the base of the whole meter mechanism as a unit, at the same time however permitting ready removal of the said mechanism after withdrawal of the screws 14.

The upper end of the meter mechanism is secured against the sloping abutments 15 by the screws 14, suitable insulating bushes 16 being interposed. The abutments are sloped in order to enable access to be had to the screws by a screw-driver without the latter fouling the counter-train and dial 17.

In order to remove the disc 3 and spindle $q$ from the meter as a unit according to the example described above, the following operations are involved:—

The detachable sector-like bath portion $e$ is removed (together with its packing piece, if fitted) by releasing the saddle 5, the top spindle bearing 7 is raised clear of the top spindle pivot and the disc 3 withdrawn sideways. This sideways movement withdraws the footstep bearing j along the groove in which the block k supporting it is fitted and in order to avoid the risk of bending the bottom spindle pivot or of damaging the bearing itself I prefer to employ a special tool in this operation. This tool, which is indicated in Figures 11, 12 and 13, comprises a distance block 23 through a hole in which a screwed spindle 24 is fitted, the spindle being adapted to enter a threaded hole 6 in the footstep bearing block k. Thus, when the spindle is screwed home in the hole 6 the distance block rests below the disc in light contact with the under surface thereof (see Figures 11 and 12) and provides such purchase as will enable the sidewise pull to be exerted simultaneously upon the disc 3 and bearing block k. When removed the parts occupy the position shown in Figure 13.

It will be noted that these operations do not involve any disturbance of the leading-in and leading-out device for the meter-constant adjustment.

The permanent magnets b, b in accordance with the present invention may be magnetized and even aged apart from the meter, being afterwards assembled in position without disturbing the flux in the steel. This is effected conveniently by the provision of soft iron keepers which are kept in position during the magnetizing process (and during the ageing process if then carried out).

The keeper as is illustrated in Figures 14 and 15 conveniently comprises a U-shaped member 25, the extremities of whose limbs are shaped to correspond exactly with the portions of the soft iron pole pieces g, g and h, h which project above and below the meter bath. The cross-sections of the limbs and of the base of the keeper are such that the keeper may be slid between the extremities of the magnet in close contact therewith without altering the flux density or direction in the steel magnet. Thus, in order say to remove a magnet from the meter at any time, it is merely necessary to apply the keeper 25 to the soft iron pole piece projections (with the keeper straddling part of the bath), whereupon the magnet may be slid on to the keeper into the position shown in dotted line in Figure 15 and removed, together with the latter which is retained in the gap separating the extremities of the magnet. Thus there is no alteration in the magnitude or direction of the flux in the steel of the magnets.

Alternatively, the extremities of the magnet may be furnished with soft iron pole pieces and a soft iron keeper applied so as to straddle the bath and to contact with the sides of these pole pieces. Under these circumstances, although no sliding of the magnet over the keeper is involved, yet as before no alteration in flux density or direction of flux within the steel of the magnet takes place when the magnet and keeper are moved.

Having now described my invention, what I claim as new and desire to secure by Letters Patent is:—

1. An electricity meter of the type described including a mercury bath, a steel permanent magnet, soft iron pole pieces, the latter being embodied in the said bath so as to provide an operative air gap, said meter including means for compensating the drooping characteristic of the percentage-error-load curve, which means comprise a magnetic shunt adapted to coact with said soft iron pole pieces in order to divert some of the main flux from the operative air gap without changing the distribution of the flux in the steel constituting the permanent magnet.

2. Means for adjusting the constant of an electricity meter of the type described including a mercury bath, a pair of lead-in contacts and an intermediate lead-in contact associated with the mercury bath, an electrical connection between said pair of contacts, an electrical connection possessing resistance from the intermediate contact to said interconnected pair of contacts, and a movable clamping piece coacting with said resistance connection and capable of being clamped in alternative positions thereon whilst in continuous electrical connection with the lead-in terminal of the meter.

3. Means for adjusting the constant of an electricity meter of the type described including a mercury bath, a pair of lead-in contacts and an intermediate lead-in contact associated with the mercury bath, an electrical connection between said pair of contacts, an electrical connection possessing resistance from the intermediate contact to said interconnected pair of contacts, a movable clamping piece coacting with said resistance connection and capable of being clamped in alternative positions thereon whilst in continuous electrical connection with the lead-in terminal of the meter and a similar set of contacts, resistance connection and a clamp in respect of the lead-out terminal of the meter.

4. An electricity meter of the type described including a mercury bath, a disc rotor therein, a laterally detachable portion for said bath and means enabling the rotor spindle and disc as a complete unit to be removed from or erected in running position while maintaining constant in magnitude and direction the flux of the magnetic circuit.

5. An electricity meter of the type described including a mercury bath, a disc rotor therein, a laterally detachable portion for said bath and a laterally detachable footstep bearing in said bath for the spindle of said disc rotor, thus enabling the rotor spindle and disc as a complete unit together with the footstep bearing to be removed from or erected in running position while maintaining constant in magnitude and direction the magnetic flux.

6. An electricity meter as claimed in claim 2, including also soft iron pole pieces moulded into said mercury bath.

7. An electricity meter of the type described including a non-magnetic frame upon which a mercury bath, top and bottom spindle bearings, rotor spindle, permanent magnet and terminal block are supported to form a unit which readily may be inserted and removed from the containing case.

8. Means for enabling a permanent magnet to be placed in operative position and to be removed therefrom with maintenance of the magnetic flux in the steel unchanged in magnitude and direction, which means comprise a pronged keeper of soft iron, whose prongs are adapted to abut pole pieces associated with said permanent magnet, the keeper being of thickness corresponding to that of the pole pieces and with a cross-sectional area at least equal to that of the magnet.

In testimony whereof I have signed my name to this specification.

SEBASTIAN ZIANI DE FERRANTI.